Oct. 13, 1970   H. DREISMANN   3,533,564
PLANT FOR GRINDING GRANULAR MATERIAL
Filed Jan. 30, 1968   3 Sheets-Sheet 1

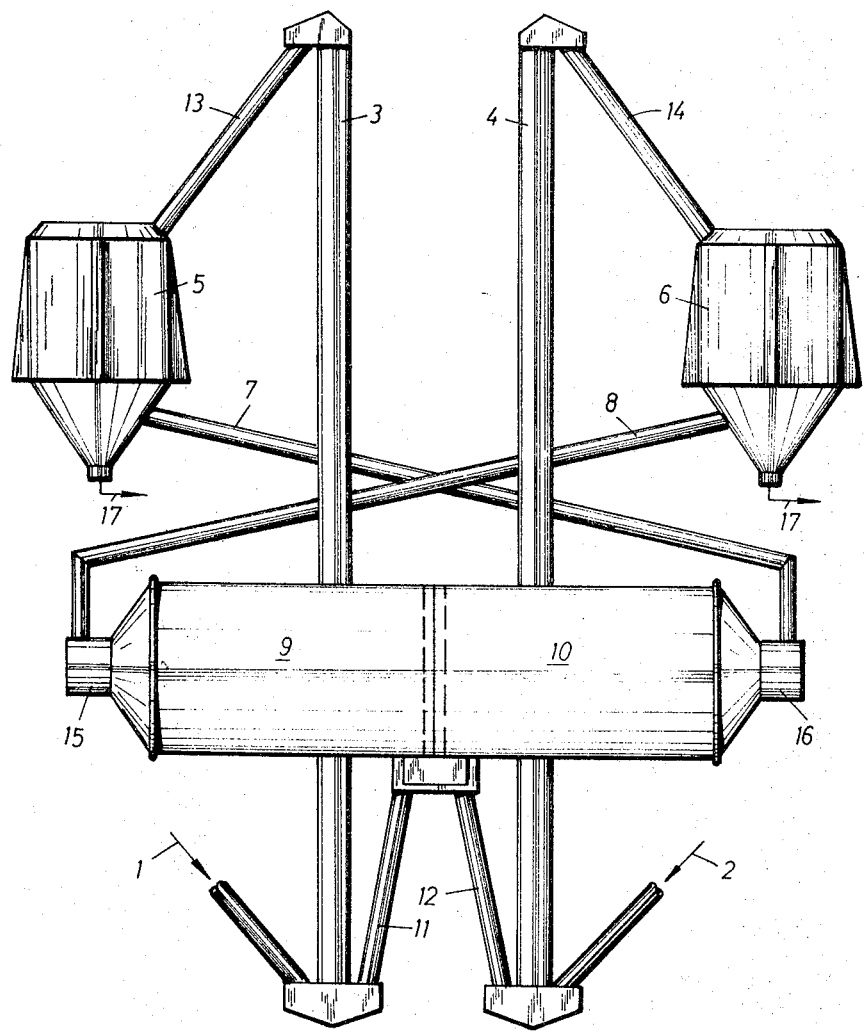

United States Patent Office 3,533,564
Patented Oct. 13, 1970

3,533,564
PLANT FOR GRINDING GRANULAR MATERIAL
Hermann Dreismann, Beckum, Germany, assignor to Pacemin A.G. Patentverwertungsgesellschaft, Zug, Switzerland
Filed Jan. 30, 1968, Ser. No. 701,647
Claims priority application Germany, Jan. 31, 1967, 1,607,501
Int. Cl. B02c 17/04, 21/00
U.S. Cl. 241—42      4 Claims

ABSTRACT OF THE DISCLOSURE

A plant for grinding granular material, which comprises two mechanical conveyors, two separate milling chambers which are operatively connected with the mechanical conveyors, and two separating units which are operatively connected with the conveyors, and which return coarse particles of the granular material. The two milling chambers along with the conveyors and the separating units succeed each other in the path followed by the material to be ground.

---

The present invention relates to a plant for grinding granular material, in general, and to such plant in which the material to be ground, which may or may not have been reduced in size beforehand, is fed by two mechanical conveyors, as it leaves two separate milling chambers, or two separating units or groups of units, which return the coarse particles in the material to the milling chambers, in particular.

Conventional equipment of this kind comprise two independently operating milling chambers, which may be situated within a common milling cylinder. The milling chambers, equipped with identical grinding equipment are similarly clad, are separated midway along the milling cylinder by a partition, each having its own delivery arrangements. Once the material to be ground has been fed in, it can be passed several times in succession through one and the same milling chamber, until it is eliminated by the separators as a finished product. There is no connection, whatever, as regards the path followed by the material being ground, between the grinding units formed by these separate milling chambers.

Exhaustive series of tests have shown that the maximum output is obtained from ball mills when the circulation rate and charging conditions in the milling chambers are well defined and, above all, identical. The output depends, among other things, on the individual milling chambers being technically well matched, their maximum output varying only within fairly narrow limits.

With an existing plant, therefore, the running of one of the two milling chambers might be set to give optimum results, whereas the other chamber might not be producing its best yield. The cause of this discrepancy lies in lack of uniformity both in the feed and in the crushability of the material fed in, as well as in differences in the air flow through the two milling chambers. The difference between the working potentialities of the two chambers means that their capacity is not fully exploited.

In the milling plant known hitherto, the aim has been, by regulating the feed distribution of the material, to keep the two milling chambers evenly charged according to the effective power consumption of the driving units. The result obtainable from such regulation was bound to be only partially satisfactory, because it could not do more than solve the problem of uniformity in purely gravimetric distribution. The natural variations in regulation, including more especially the separating-out of the particle sizes in the bulk material when carried by normal conveyor equipment, have persisted as drawbacks and have constantly resulted in differences between the operational characteristics of the milling chambers.

Another disadvantage of the existing plant is that the grading by the separators differs in the two milling units, notwithstanding uniformity in speeds and in blade settings. The fineness of the finished product is compounded from the mean values achieved in each case in the two milling chambers.

It is, therefore, one object of the present invention to provide a plant for grinding granular material, in the case of a plant of the kind described above, which includes an improvement of the output and the specific consumption of power solely by a special arrangement of the paths followed by the material, without any additional equipment.

It is another object of the present invention to provide a plant for grinding granular material, wherein the two milling chambers, along with the conveying and separating equipment that precedes them shall succeed each other in the path followed by the material that is to be ground.

It is yet another object of the present invention to provide a plant for grinding granular material, wherein the delivery pipes from the milling chambers of a tube mill, preferably one with central delivery, should each be connected to the conveyor feeding the separator of the other milling chamber. In a second possibility of the present invention, the pipe running from the conveyor that follows one of the milling chambers is connected to the cyclone serving the other milling chamber. A third possibility embodying the present invention principle is, finally, to connect the oversize-return pipe that carries the coarse material from the separator serving one milling chamber to the feed connection of the other milling chamber.

The cyclones and, if desired, the preliminary crushers, such as hammer mills and/or preliminary ball mills, may be swept by hot gases in conventional manner.

The advantage of the plant here proposed is that the material fed into one milling chamber passes through the second milling chamber on its second time round, then again through the first chamber on its third time round and so on, so that the milling chambers, while working independently, are interlinked. Since the speed of flow of the material within the chambers depends, among other things, on the particle size, the charging level in both chambers will be completely in balance after only a short period of running, so that no difference will arise in the operating characteristics of the two chambers. Any variation in the feed to the two milling chambers is quickly smoothed out, as regards both the feed rate and the particle-size distribution. Variations in crushability will arise to the same extent in both chambers. There is no need for additional automatic feed distribution.

In milling plants conforming to the present invention, the material fed to the separators is far more uniform and given identical separation settings, practically identical fineness in the finished product will be obtained from each separator. As a result, the fineness of the end product of the plant as a whole will be markedly more constant. By exploiting the capacity of both milling chambers to the full, the total capacity is increased considerably, so that the specific milling work done per ton of finished product is reduced and running costs are accordingly lower.

With these and other objects in view, which will become apparent in the following detailed description, the present invention will be clearly understood in connection with the accompanying drawings, in which:

FIG. 3 is a schematic elevation of a milling plant in which it is the oversize-return pipes from the separators which are crossed over.

Figure 1:
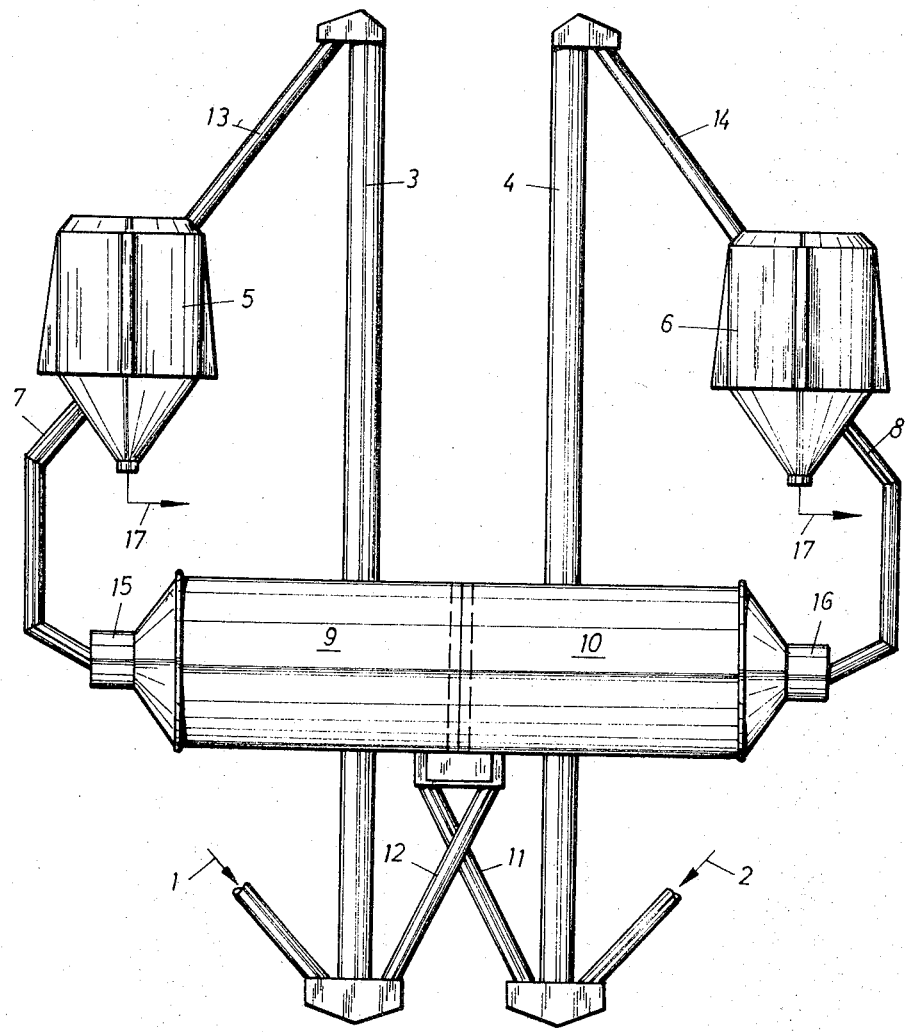
FIG. 1 is a schematic elevation of a milling plant with crossed-over delivery pipes from the two milling chambers.

Referring now to the drawings, and in particular to FIG. 1, the material is fed in through conduits 1 and 2, which material comes either directly from distributing machinery (not shown) or by way of preliminary crushers (likewise not shown), and then passes to bucket elevators 3 and 4. From these bucket elevators 3 and 4, the material is fed through connecting pipes 13 and 14 to separators 5 and 6. The coarse material remaining after separation passes via the oversize-return pipes 7 and 8 to feed connections 15 and 16 of two milling chambers 9 and 10, respectively, while the fines are extracted through pipes connected at exists 17. After passing through the milling chambers 9 and 10, the material leaves through change over delivery pipes 11 and 12 and is fed, along with additional feed material from 1 and 2, to the bucket elevators 3 and 4.

The embodiment illustrated by example in FIG. 1, shows how the two separate milling chambers 9 and 10 follow each other in circuit by virtue of the cross-over arrangement of the delivery pipes 11 and 12 from the milling chambers 9 and 10. The material fed in at 1 to the bottom of the bucket elevator 3 passes through the connecting pipe 13 to the separator 5, which divides it into coarse material and fines. The coarse material so separated is fed by way of the oversize-return pipe 7 to the milling chamber 9. After milling, it passes into the delivery pipe 11, which is connected to the bottom of the second bucket elevator 4. The feed material from 1, already separated and ground once, now passes by way of the second bucket elevator 4, and its connecting pipe 14, to the second separator 6, the coarse material from which is fed thorugh the oversize-return pipe 8 to the second milling chamber 10.

The material is then recirculated to the first milling chamber 9, since the deilvery pipe 12 of the milling chamber 10 is similarly connected to the bucket elevator 3 of the other milling chamber 9. Material which is to be subjected to several stages of grinding is thus fed alternately to each of the milling chambers 9 and 10, so that a continuous balance is obtained, because the material fed in at conduit 2 is meanwhile being circulated in a similar manner.

Figure 2:
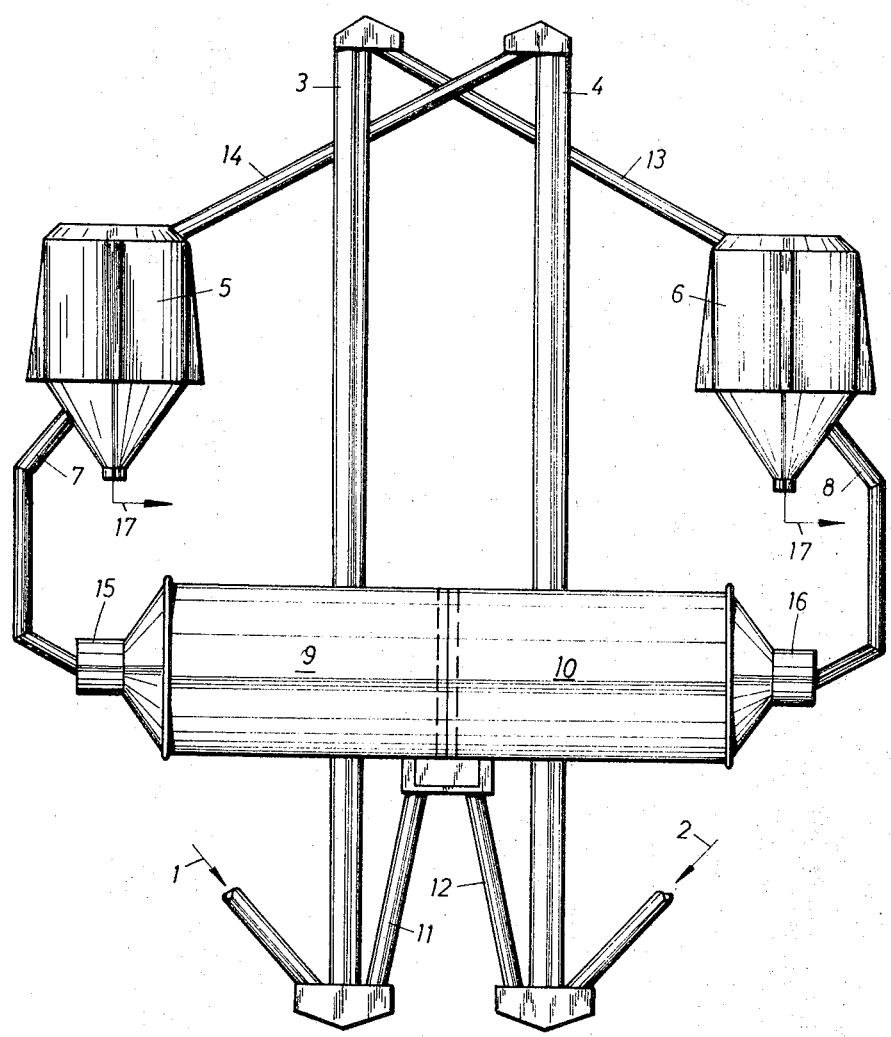
FIG. 2 is a schematic elevation of a milling plant in which the pipes running onwards from the bucket elevators used for circulating the material are crossed over.

Referring now again to the drawings, and in particular to FIG. 2, in the embodiment shown in FIG. 2, the method of feeding the material is substantially the same as already described in connection with the first embodiment, the same elements having the same numerals to which a prime is added. In the plant illustrated in FIG. 2, however, the change over from the circulation system supplying the one milling chamber to that which serves the other chamber is effected as the material leaves the bucket elevators 3' and 4', each of the change over connecting pipes 13' and 14' of which leads respectively to the separator 6' or 5' of the other milling chamber 10' or 9'.

Referring also to the drawings, and in particular to FIG. 3, finally, in the third embodiment, illustrated in FIG. 3, the same elements have the same numerals to which a double prime has been added, the oversize-return pipes 7" and 8" from the separators 5" and 6" are crossed over, constituting the changeover pipes, so as to run to the feed connections 16" and 15" of the milling chambers 10" and 9", respectively. In this way, the changeover takes place after the coarse material has passed through the separators 5" and 6". The material fed in at 1" to the bottom of the bucket elevator 3", along with the ground material from the milling chamber 9", thus passes to the separator 5", from which the coarse material goes via the oversize-return pipe 7" to the feed connection 16" of the milling chamber 10". The ground material from the latter, along with additional material fed in at conduit 2", is then taken by the bucket elevator 4" to the separator 6".

The present invention is not limited to the practical embodiments here illustrated and described, since the milling plant can be operated with several separators combined in a group. Again, the material fed in at conduits 1 and 2 may be passed directly into the two milling chambers 9 and 10. Finally, it is also possible to design the plant as a simple mill with bucket elevator circulation, for grinding dry material or for grinding and drying, with hot air flowing through the separators and through the preliminary crushers, if any, which precede the milling chambers.

While I have disclosed several embodiments of the present invention, it is to be understood that these embodiments are given by example only and not in a limiting sense, the scope of the present invention being determined by the objects and the claims.

I claim:

1. A plant for grinding granular material, comprising
   a first mechanical conveyor,
   a first separating unit operatively communicating with said first mechanical conveyor and including a first coarse particle exit,
   a first milling chamber operatively communicating with said first coarse particle exit of said first separating unit,
   a second mechanical conveyor,
   first means communicating said first milling chamber with said second mechanical conveyor,
   a second separating unit operatively communicating with said second mechanical conveyor, and including a second coarse particle exit,
   a second milling chamber operatively communicating with said second coarse particle exit of said second separating unit,
   second means communicating said second milling chamber with said first mechanical conveyor, whereby coarse particles of said granular material which have passed from one of said milling chambers are ground a further time by the other of said milling chambers, and
   said first coarse particle exit operatively communicating exclusively with said first milling chamber and said second coarse particle exit operatively communicating exclusively with said second milling chamber.

2. The plant, as set forth in claim 1 wherein
   said first and second means include delivery pipes connecting each of said milling chambers, respectively, with one of said conveyors respectively feeding that separating unit which communicates with the other of said milling chambers, respectively.

3. The plant, as set forth in claim 1, which includes
   connecting pipes communicating said conveyors with said separating units, respectively, and
   one of said connecting pipes from one of said conveyors, the latter operatively communicating from one of said milling chambers, is connected with that separating unit which communicates to the other of said milling chambers.

4. The plant, as set forth in claim 1, which includes oversized return pipes connecting said coarse particle exits of said separating unit, respectively, by means of feed connections with said milling chambers, and carrying the coarse particles of said granular material, and one of said return pipes serving one of said milling chambers is connected with the coarse particle exit of that separator which is operatively communicated from the other of said milling chambers via the associated conveyor therebetween.

References Cited

UNITED STATES PATENTS

| | | | |
|---|---|---|---|
| 1,261,398 | 4/1918 | Janney | 241—137 |
| 1,406,109 | 2/1922 | Trent | 241—137 X |
| 1,630,992 | 5/1927 | Waterman | 241—153 X |
| 1,710,666 | 4/1929 | Newhouse | 241—153 X |
| 2,894,696 | 7/1959 | Miller | 241—54 X |
| 3,189,285 | 6/1965 | Miller | 241—54 X |

ROBERT C. RIORDON, Primary Examiner

D. G. KELLY, Assistant Examiner